Feb. 3, 1942.  G. A. RUBISSOW  2,271,662
FILTERING ELEMENT AND NEW METHOD FOR ITS MANUFACTURE
Filed Jan. 17, 1939  2 Sheets-Sheet 1

INVENTOR.
George A. Rubissow

Feb. 3, 1942.  G. A. RUBISSOW  2,271,662
FILTERING ELEMENT AND NEW METHOD FOR ITS MANUFACTURE
Filed Jan. 17, 1939  2 Sheets-Sheet 2
Fig. 14.  Fig 16.  Fig. 18.
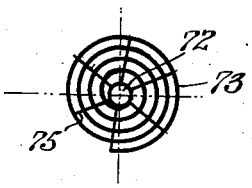
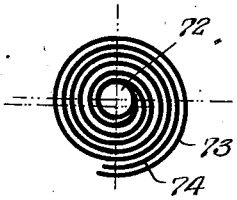
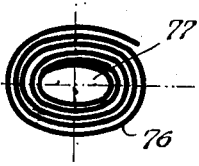
Fig. 15.  Fig. 17.  Fig. 19.
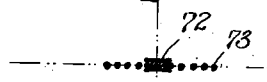
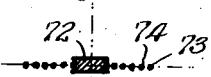
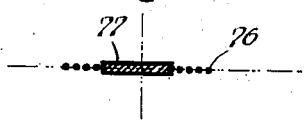
Fig. 20.
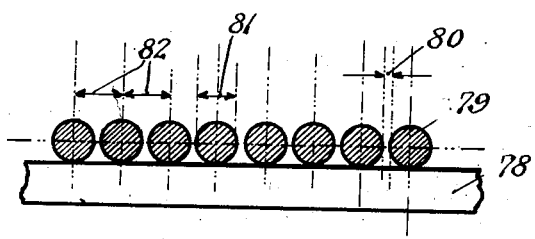
Fig. 22.
Fig. 21.
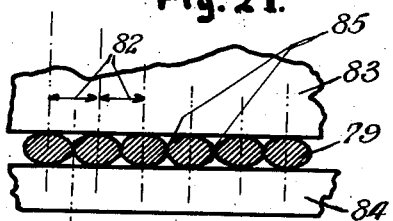
Fig. 24.
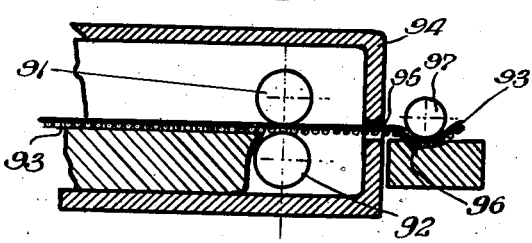
Fig. 23.
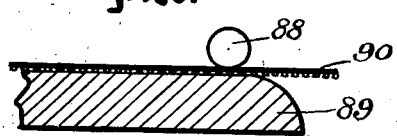
INVENTOR.
George A. Rubissow.

Patented Feb. 3, 1942

2,271,662

UNITED STATES PATENT OFFICE 2,271,662

FILTERING ELEMENT AND NEW METHOD FOR ITS MANUFACTURE

George Alexis Rubissow, New York, N. Y.

Application January 17, 1939, Serial No. 251,362

6 Claims. (Cl. 210—169)

This invention consists of a new method for the manufacture of filtering elements made from metal or metal alloys or other suitable solids in a form of filtering gauzes, filtering screens or the like. The so-obtained filtering elements will filtrate the smallest impurities, and furthermore may have the exact size of the filtering meshes controllable to any desired size, however small.

To facilitate the description of this invention the following abbreviations will be employed:

Filtering element "FE"; this will means a filtrating screen, gauze, net or the like made from wires, and when employing the word "wire" this will mean wire, strips or the like in any form and made from any suitable material such as metal, metal alloys; and when employing the word "metal" this will mean any suitable material as described above.

It is well known that modern industry requires filtering elements capable of filtrating the smallest impurities having a maximum diameter of about 0.00002" (of an inch) or even less. Such filtering elements are extremely difficult to obtain. They may be provided with certain very thick filtrating blocks from compressed leather, screens, chemicals, cloths, earth, etc., but such filtrating blocks are not easy to use as they require high pressures and offer the risk of irregularities and many other inconveniences.

The present invention provides a new kind of FE made from metal wires wherein the spaces (the mesh between the wires) are of the smallest desirable dimensions, which FE are very easy to handle and may be used as usual for any kind of filter having one or more filtering elements in disc form, screen or circular form, etc.

These FE's will be able to filter any kind of liquids and gases of any nature even if the impurities to be eliminated are minute and exceedingly small.

This invention consists of a manufacturing process which provides cheap and easy means of making new FE or converting the old FE into new FE, having the above-mentioned features.

In FE the following abbreviations will be employed:

$D=$ maximum of the filtering space measured perpendicularly between two longitudinal wires of the FE. $D$ is the maximum measure of the mesh in the most disadvantageous place.

$m+1=$ the number of longitudinal wires per inch (measured lineally).

$n+1=$ the number of transversal wires per inch (measured lineally).

$m=$ the number of meshes (D) per inch between two of each of the longitudinal wires (measured lineally).

$n=$ the number of meshes (B) per inch between two of each of the transversal wires (measured lineally).

$H=$ the smallest diameter of the impurities to be filtrated. $H$ must always be larger than $D$; $H>D$.

$S=D/H$, which we will call filtrating security co-efficient which varies from 1 (one) when $D=H$, to any reasonable small amount. Generally $S=0.75$ or $0.66$ is a sufficiently small co-efficient offering absolute security for filtrating.

$C=$ the co-efficient of the lineal thermic-expansion of the metal.

$T_r^\circ=$ room temperature in centigrade under which the FE will be used, and also the room temperature of the workshop where this method is applied.

$T_w^\circ=$ the amount in degrees of the temperature in centigrade exceeding the $T_r^\circ$, to which the wires of the FE are submitted before and/or during the application of pressure $P_w$.

$P=$ mechanical pressure in pounds per square inch to which the wires of the FE are submitted without assistance of the thermic-expansion of the material.

$P_w=$ mechanical pressure applied on the FE's wires when they have been previously heated to the temperature of $T_w^\circ$ degrees centigrade higher than the $T_r^\circ$ provided that the press surfaces of the press apparatus also have a temperature of approximately $k.T_w^\circ$ more degrees than the $T_r^\circ$.

$K=$ is an experimental co-efficient substantially approaching 1 (one).

The further objects and novel features of this invention will appear more fully from the following detailed description, and in certain cases in connection with the accompanying drawings which are however, made only for purposes of schematical illustration and are not intended as a definition of the limit of the invention.

Figure 1 is a top plan view of one embodiment of a part of a filtering element, wherein 51 are longitudinal wires and 52 are transversal wires.

It may be remarked that the meshes between the longitudinal wires may be so chosen that their longitudinal widths, i. e. the space between the two transversal wires is longer than their transversal heights, i. e. the space between two longitudinal wires.

Figures 4, 5, 6, and 7 represent a cross-sectional view of a filtering element in which the filtering element is mounted.

Figures 8, 9, 10, and 11 represent a top plan view of a part of a filtering element.

Figures 11, 12:
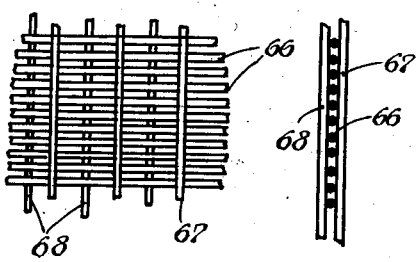

Figure 12 represents a cross-sectional view of Figure 11.

Figure 13:
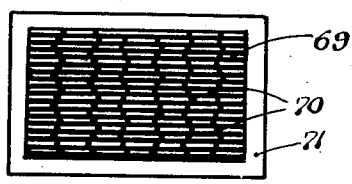

Figure 13 represents a top plan view of a filtering element enclosed in a rigid frame.

Figure 14 represents a top plan view of a filtering element in the form of a spiral, made from one wire.

Figure 15 is a cross-sectional view of Figure 14.

Figure 16 is a top plan view of a filtering element made from two parallel laid wires in a spiral form.

Figure 17 is a cross-sectional view of Figure 16.

Figure 18 is a top plan view of a filtering element composed of an elliptical core surrounded by a parallel wire.

Figure 19 is a cross-sectional view of Figure 18.

Figure 20 is a schematical cross-sectional view of a plate and of a filtering element.

Figure 21 is a cross-sectional view of a filtering element placed between two surfaces.

Figure 22 is another cross-sectional view of a filtering element.

Figures 23 and 24 are schematical cross-sectional views of an apparatus for making filtering elements.

All these drawings are to be interpreted schematically, and have been made on a very large scale (with the exception of Figures 23 and 24) for illustrative purposes.

The first aspect of this invention consists of mechanical application of pressure P of the FE's wires, which pressure P may be applied perpendicularly, or substantially on any other angle to the FE, and when applied, create a deformation of the cross-section of the wires, so that D becomes smaller, due to the cross-sections of the wires becoming wider.

The practical application of this method is very easy—the FE are passed under any kind of suitable roller press or between a fixed plate and roller which moves on it, or both the FE and the rollers may move; or by any kind of hammer press, hand, machinery, electrical machinery, magnetic or otherwise. The control of the amount of pressure P may be carried out by any known means assisted by strong spring control arrangements—water cylinder with outlet security valve arrangement and so forth. For example, FE made from copper wire which we can find on the market which has for instance $D_1=0.005$ will be converted into $D_2$ having 0.006. This may easily be done if the pressure P which is applied can press the wires so that $D_1$ becomes $=D_2$.

The second aspect of this invention consists in the composing of the FE by placing the wires one parallel to another at pre-determined mesh-distances, the accuracy of which is controlled by the theory of variation. In fact, the diameter of the wires to be employed is a constant known figure, the quantity of the required meshes per one inch and their D is known, therefore, according to the theory of the variation when putting all such wires parallel one to another on a plate, and this so that they will fit into a suitable predetermined gabarit, then the wires will lay one parallel to another and will fit in such a foreseen gabarit measurement; as by way of a first example they will fit in one inch, or for a second example in 1.2"; or for a third example in .095 of an inch; then we will obtain three types of different FE's, each of which will always have the same $m$ number of meshes, but will have different D spaces of meshes, i. e.

First example $D_1=1/m$
Second example $D_2=1.2/m$
Third example $D_3=0.95/m$

According to the set theory of variation, even this purely mechanical-composing-contacting process of the wires give almost absolute accuracy when D is sufficiently small. Such FE are then subjected to the electric welding or soldering as described further on in the specification. If desirable, transversal wires placed in any suitable direction may be welded to the FE on one or both of the surfaces and may, by this means, reinforce the element itself.

The third and main aspect of the invention consists in applying the phenomena of the expansion of metals from the influence of heat. It is known that the expansion of metals is definite for each kind and it is substantially proportionate to the amount of the degree of the temperature applied to such metals.

For this third aspect special FE should be used, composed of longitudinal wires made from any desirable solid material, while the transversal wires should be made from a metal which does not expand when heated on $T_r°+T_w°$ centigrade; the number of $m+1$ of the longitudinal wires should be sufficiently greater than $n+1$, the number of transversal wires. If desired, the transversal wires may be entirely eliminated and replaced by welding of the longitudinal wires as it will be described further on in this specification.

This third aspect has three operations—the first one is the heating of the FE's wires on the $T_w°$ centigrade higher than $T_r°$. Once the FE's wires have been so heated to the temperature of $T_w°$, then the same FE still having the temperature of $T_w°$ degrees higher than $T_r°$, is then submitted to a second operation consisting of the application of press-means (roller, hammers, and the like) which press-surfaces of the press-means must have substantially the same temperature of $T_w°$ (or $k.T_w°$) in order not to cool down the FE wires before the required compressing-deformation of the cross-sections of the wires has been reached. The second operation may be done simultaneously with the first operation. The compressing-deformation action must be so chosen that the wires when the operation has just been finished (the $P_w$ has just been applied) the filtering spaces between the longitudinal wires (mesh=D) are eliminated, which is the case when $D=0$ (zero), with FE in such state (D=zero) this FE is then submitted to a third operation consisting of cooling; self-cooling at room temperature, or accelerated cooling by any means, or even spontaneous cooling in water, oil, etc., with or without hardening, tempering, aging or the like.

When this third operation is fulfilled the metal wires become cooler, losing the calories provided by $T_w°$, and will then be diminished in their length and width, on account of thermic contraction caused by the cooling down of the FE back to the room temperature $T_r°$, so that their cross-sections will also diminish and this will provide newly born free-spaces, meshes, between the wires, which free-spaces will then become in their total, measured per one (1) inch, equal to substantially $T_w°$ multiplied by the co-efficient C of the lineal thermic expansion. This so-acquired very small amount substantially $=T_w°$ C. will form the total sum of the newly born meshes, therefore $T_w° C = m.D$ and the D will then be equal (substantially) to $$\frac{T_w°.C}{m}$$

It may be remarked that the transversal wires, being made from a material like Invar, will not contract when the FE will be cooled down from $(T_r° + T_w°)$ to the $T_r°$ temperature. The use of the formula $$D = \frac{T_w°.C}{m}$$

and all the possible variations of it is also a subject of this invention. Nature has so arranged that the amounts of the C and $T_w°$ and $m$ and $n$ are very easy to be so chosen that they give just the result required, offering any desirable security co-efficient.

$$S = \frac{D}{H}$$

and providing any desirable accuracy of the smallest dimensions of the filtrating mesh D.

By way of example a practical application will be shown. FE (having non-square mesh form) consisting of $m+1$ longitudinal copper wires and $$n = \frac{m+1}{3}$$

(approximately) transversal wires made from Invar. Copper having $C = 0.0000167$.

First operation—heating the FE by $T_w°$ centigrade $= 100$. This heating will increase the linear measure of $1''$ of $a: mD = 100 \cdot 0.0000167 = 0.00167$ of an inch. If now this FE is subjected to the second operation, i. e. a pressure of $P_w$ at the same $T_w°$ centigrade temperature and then the third operation is applied, then such FE will obtain a newly born total of meshes=to the above-mentioned $mD = 0.00167$ per each of one inch, so that if we have 301 longitudinal wires per inch, then the total number of meshes formed between two of each longitudinal wires, in one inch length, will be $m = 300$ and we will obtain $D_{(300)} = 0.0000056''$ of an inch, being the newly born mesh measured at room temperature $T_r°$ centigrade.

In the same example if $m = 200$, then $D_{(200)} = $ substantially $0.00000835''$ of an inch.

If $m = 100$; then $D_{(100)} = 0.0000167''$.

If $m = 50$; then $D_{(50)} = 0.0000334''$, and so forth. Certain correction of co-efficient K will slightly alter these theoretical figures and K will be established only in practice in accordance to each kind of metal, form of rollers, speed of pressure application, etc.

In the same example if $T_w°$ is only 50° then all the data for $D_{(300)}$ $D_{(200)}$ etc. will be halved.

In the described third aspect $$D = \frac{T_w°.C}{m} \text{ of an inch}$$

$$m = \frac{T_w°.C}{D} \text{ number of meshes between each of two longitudinal wires, per one inch}$$

$$C = \frac{D.m}{T_w°} \text{ coefficient of linear thermic expansion}$$

$$T = \frac{D.m}{C} \text{ temperature in centigrade}$$

The use of this formula provides all answers re the figures to choose. For instance, if the security co-efficient will be chosen—$S = 0.666$ and if H is prescribed to be $0.00003''$, then for an example with 200 longitudinal copper wires per inch, we will have $D = 0.00003 \times 0.66 = 0.00002$ then $T_w°$ will be =

$$\frac{D_{200}}{C} = \frac{0.00002 \cdot 200}{0.0000167} =$$

substantially 240°, which means that if we employ 200 wires per inch we should use the temperature $T_w° = 240°$ centigrade.

To make a proper application of the third aspect of this invention, it is necessary that the transversal crossing wire should be made from Invar material or similar, which does not change substantially when heated up or cooled down. Such transversal wires made from Invar or similar may be pressed on very tightly or affixed by adhesion or by welding, etc. in the crossing points to the longitudinal wires. When the transversal wires made from Invar or similar will be cooled down from $(T_r° + T_w°)$ to the $T_r°$ temperature, then they will not displace the distances between the axis of the horizontal wire, even despite the fact that at the same time each diameter of the horizontal wires (i. e. their cross-section) will contract and will form the filtrating spaces D. The horizontal wires do also contract in their length but this must be considered as being without importance because when placing the transversal Invar wire according to this process, it is advisable to place them at such a distance, one from the other, that sufficient reserve will be provided for contraction in length of the longitudinal wires.

All these examples are only given by way of illustration and approximately; and do not limit the invention to the widest application of the given formula.

A remark must be made that in practice some difficulties will occur in determining the speed of execution of the second operation as well as to determine exactly the amount of $k.T_w°$. Care must be taken that $T_r°$ when being the temperature at which the FE should be in service is subject to variations of climate, barometrical heights, etc., and therefore an average temperature $T_r°$ centigrade must be established to suit all purposes with admissable approximity.

Figure 1:
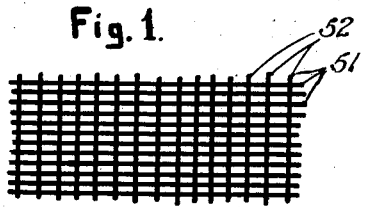

The longitudinal wires 51 shown in Figure 1 are held together by means of transversal wires 52 which may be all woven or welded on the longitudinal wires 51. The thermic co-efficient of expansion C should be different for 51 and 52 and in many cases it will be advisable to make this difference as large as possible, for instance, to make the transversal wires 52 from Invar material or to weld the longitudinal wires between them with Invar material.

Figure 8:
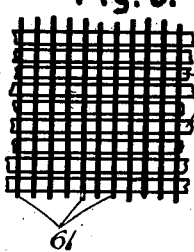

In Figure 8 the Invar transversal wires 61 are welded on the longitudinal wires 60. They may also be woven through the longitudinal wires if the character of the meshes allow.

Figure 9:
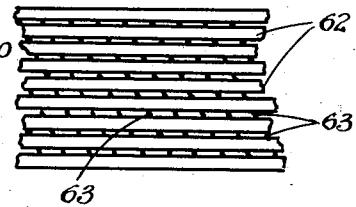

In Figure 9 are shown the welding points 63 which weld together the longitudinal wires 62. The welding may be done by employing Invar material or such soldering metals, the thermic coefficient of which is extremely small. The welding may be done without any soldering material. In this case, however, the welding should be done after the meshes have already been formed by means of one of the processes described in this specification.

Figure 10:
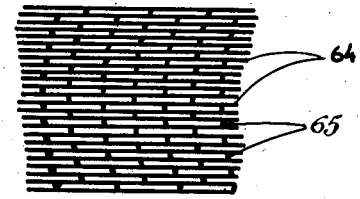

In Figure 10, the welding is done in curved lines following the dotted lines 65. The longitudinal wires 64 are held together by means of the welding points placed on the crossing of the dotted lines 65 with the longitudinal lines 64.

On Figures 11 and 12 the filtering element composed of a plurality of longitudinal wires 66 is made rigid by welding on both surfaces of the transversal wires 67 on upper surface and 68 on the lower surface.

On Figure 13 a filtering element composed of a plurality of longitudinal wires 69 is held together by means of welded points 70 and the whole element is solidly attached or fixed on a rigid frame 71.

Figures 14 and 15 show the filtering element which is wound around a central core 72 by means of a long wire 73. The wires are then welded to transverse wires 75, similar to the method shown in Figure 8, or to each other as shown in Figures 9, 10, 11, 12, or 13.

In Figures 16 and 17 there is shown a central core 72 around which is wound a spiral composed of two parallel wires 74 and 75. The welding points are not shown in the drawings.

Figures 18 and 19 show a filtering element formed by a long wire 76 wound around an elliptical core 77.

Figures 2, 3:
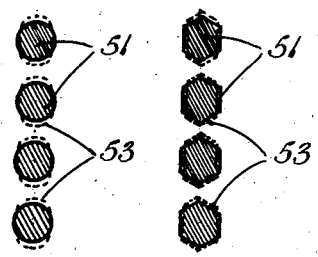
Figure 2 is a cross-sectional view of the filtering element shown in Figure 1, on an abnormally enlarged scale.
Figure 3 is a sectional view of the filtering element shown in Figure 1, wherein the wires are of hexagonal form, also abnormally enlargened.

In Figure 2 is shown a small portion of longitudinal wires 51 as they appear before applying the pressure on their upper and lower surfaces. In the same figure 53 shows the cross-section of the said wires 51 after the pressure has been applied and the desirable deformation reached by which the meshes have been formed mechanically, without application of the phenomena of expansion and contraction of materials as described in the third aspect of this invention.

Figure 3 represents the same idea as in Figure 2 using instead of circular cross-sectional, hexagonal cross-sections of the longitudinal wires. In both Figures 2 and 3 the transversal wires or the welding points between the longitudinal wires are not shown.

In Figures 4, 5, 6, and 7 is shown a method of application of the second aspect of this invention wherein on the gabarit plate 55, which has the same length and dimensions between the gabarit edges 56 and which by example has been chosen equal to two inches.

Figure 4:
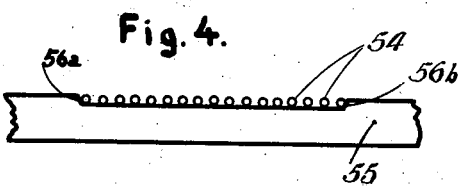

In Figure 4 in this predetermined gabarit form between 66a and 66b are placed seventeen wires, by way of example, each of which is 1/16" in diameter. These seventeen wires form sixteen meshes each of which is equal to about 1/15 of an inch.

Figure 5:
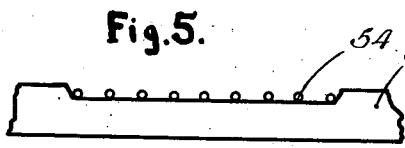

In Figure 5 when placing only nine wires of 1/16" diameter we obtain 8 meshes each of which is equal to about 3/16".

Figure 7:
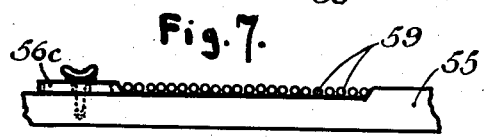

In Figure 7 when placing 22 wires of 1/16" diameter we obtain 21 meshes each of which will be equal to about 1/34". In Figure 7 is shown 56c an adjustable edge which could be with the necessary precision, so placed and thereafter rigidly affixed by suitable means that the desirable predetermined gabarit is obtained. Instead of one, the two edges may be adjustable.

This example shows clearly how the theory of variation as explained in the second aspect of this invention could be applied, especially when it is desirable to obtain very small meshes.

Figure 6:
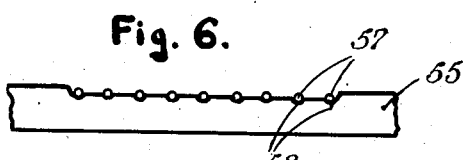

In Figure 6 it is shown how the longitudinal wires 57 in the case of Figure 5 may be placed in respective guideways 58, which may be desirable in the event the meshes are too big and the theory of variation cannot give sufficient accuracy.

In Figure 20, plate 78 is made from Invar material. On this plate is placed longitudinal wires 79 having a mesh distance 80 between them and being each of a diameter 81. The axis of the longitudinal wires are placed one in relation to another having a distance of 82. If heat and pressure are applied as shown in Figure 21 wherein the filtering element 79 has been compressed together in such a way that the distance between their axis 82 has remained substantially the same but the meshes between them instead of remaining equal to 80 as shown in Figure 20 has been practically eliminated, becoming a contact surface 85, which has been obtained by the application of the pressure, provided between the surfaces 83 and 84. 83 and 84 may be made from Invar material or similar, may be in roller form or hammer, plane or any curved surface. By using the Invar material for 83 and 84, the variation of the temperature will then not affect the displacement of the axis 79a of the longitudinal wires, and when the whole filtering element and surfaces 83 and 84 will be cooled to room temperature, the meshes will be formed automatically by contraction of the cross-sections of the longitudinal wires. After such cooling down and formation of the meshes, one of the surfaces may be removed and the filtering element could then be rendered rigid by such means as welding, soldering the wires together, etc.

In Figure 22 is shown a filtering element in cross-section wherein the longitudinal wires 87 are soldered on the transversal Invar wires 86.

Figure 23 shows schematically a roller 88 and a surface 89 between which passes the filtering element 90.

In Figure 24 are shown two rollers 91 and 92 between which passes the filtering element 93. A casing 94 surrounds the rollers and inside of this casing is kept the necessary temperature, or if desired, the casing is filled by vapors which will decrease the cohesional effect between the wires.

If the wire comes out of the casing through the opening 95, it may if desired, pass through a slightly curved opening formed by guideway 96 and the roller 97 for purposes of facilitating the opening of the meshes.

A fourth aspect of this invention is the manufacture of new kinds of FE which consist only of longitudinal wires laid parallel one to another, and no crosswires nor transversal wires are provided.

The non-crossing FE conforming to this invention consists of a plurality of wires placed one close to another, nearly touching each other. The wires may be placed one parallel with the other in straight or curved lines, or one or more long wires may be wound around a center core to form a disc or may be wound around any central point in a spiral form (substantially circular) to form a circular disc—or may be wound in any desirable form such as ellipse, combination of curves with straight lines, etc., or follow any contour.

When applying the third aspect of this invention to such non-crossing FE, it is recommended to place the FE temporarily in a special frame or holder, made preferably from Invar material. For instance, both sides of the FE at the ends of the longitudinal wires are placed between two plates or two bars of Invar material, so that the FE is practically held in it during the application of the third aspect of the invention. After such application the FE is cooled down and the meshes are formed accordingly; then such FE is subjected to a special welding or soldering operation consisting of welding together the appropriated points of the longitudinal wires, and this will replace the absent transversal wires. This welding or soldering may be made electrically or by other means. The welding may follow imaginary transversal lines or points and may be chosen in any direction and having any contour. They may be done on one side only or on both sides—they may be done in the form of points or short lines or in curves. Such new kind of FE will have a very smooth surface because of the absence of the transversal crosswires, being more durable because of having no cross points in which the material is usually deformed abnormally; they will be lighter and substantially thinner and will offer more filtrating efficiency because each mesh D will be more efficient, and the total of meshes ($mD$) being much greater per square inch than in ordinary FE.

Instead of employing frames of Invar material, the FE may be put temporarily between two parallel plates of Invar material, or may be passed through rollers made from Invar material. In this latter case, when the FE, having still the temperature of approximately $T_w°$ is passed uninterruptedly through cold rollers, cooled down to $T_r°$ or lower, the pressure between these rollers (made of Invar material) being sufficient to prevent a free displacement of the axis of the FE's wires in relation one to another, displacement which may be caused by the cooling down of the wires; then uninterruptedly the electric welding as described previously will take place. Just before and during the application of the operation of the welding, it is advantageous to cool the FE as low as economically possible.

The fifth aspect of this invention consists of an application on the FE of a mechanical pressure without any heat supply (P cold) until the meshes are entirely closed or nearly closed, and only after this operation to submit such an already compressed or slightly deformed FE to the third operation as described in the third aspect.

The sixth aspect of this invention is the question of the manufacturing of FE wherein the necessary treatment is applied to eliminate or to reduce to a minimum the cohesional force between the wires of the FE. For this reason it is recommended a previous polishing of wires, dry or wet—with or without chemicals, or a slight greasing or oxidizing of them. It may also be recommended to prosecute the operation of the application of heat ($T_w°$) and of the pressure ($P_w$) in an "atmosphere" of a filled air, of water vapor, or vapor of benzine, benzol, gasoline, toluol, alcohol or the like.

The seventh aspect of this invention consists of applying to the FE a mechanical pressure under such conditions wherein the cohesion between the crossing points of the woven wires will be increased. Such operation may be done for example in vacuum casing or with the assistance of special chemicals to de-grease the film of any nature with which the wires of the FE may be covered.

The eighth aspect of this invention consists in submitting the finished FE to a vibration action (mechanical, electro or electro-mechanical) with or without the assistance of rubber means, in order to provoke a certain looseness between wires. This may also be realized by means of passing the finished FE between two rollers or surfaces, so that the FE before or after passing the rollers or the surfaces will be guided for slight curving without remaining deformed.

The ninth aspect of this invention is a special cross-section of wires offering easier control of their deformation when pressure is applied upon, and offering better homogeneity of D. Such cross-sections of the wires may be in either a circular, square, parallelogram or hexagonal form of equal or unequal sides (by groups of 2), or elliptical form or a combination of two flat sides (an opposite pair of sides) with curves above and below, or any other suitable shape.

Wires having cross-section with special cut-out borders from one of their sides, and other sides provided with a fitted in border can be assembled together one parallel with the other, the cut-out border of the cross-section touches slightly the fitted in border of the same cross-section, and this offers an easy control of D. This is especially important for filtering elements which have no transversally-crossing wires.

The tenth aspect of the invention consists in composing the same FE with at least two different kinds of wires—for instance, the longitudinal wires being made of one material (one kind of metal or metal alloy) and the transversal wires from any other kind of material so chosen that their respective co-efficients of thermic expansion ($C_1$ and $C_2$) of these materials will be different. If the difference between $C_1$ and $C_2$ will be sufficiently large, then the material from which the transversal wires are made, may substantially replace the use of Invar or like materials.

The eleventh aspect of this invention consists in submitting the FE to the hardening or the heat treatment, tempering, annealing or ageing, etc., or any combination of the same after the FE has been produced.

The twelfth aspect of this invention refers to a special electro-welding apparatus for welding the non-crossing FE wherein one part of it is a knife-like or saw-like device, sufficiently sharp on its side; this knife-like device will contact the points or the lines upon which the welding should take place. This same device should preferably be charged by a negative pole of the current in the case of direct current. The other part of the apparatus may also be a knife-like or saw-like device, or a bar or plate, etc. When FE contain transversal wires, then these transversal wires when placed in suitable places may be welded or soldered on the surface of the non-crossing FE simultaneously with the longitudinal wires (or wires replacing them in coil-disc form of FE) being welded between them following their crossing points with the transversal wires.

The thirteenth aspect of this invention consists in appropriate use of the apparatus required for the application of the pressure for this method. This apparatus may be mechanical roller presses of any kind, or hammer-presses of any kind. One of the special aspects of pressing apparatus for this purpose may be so realized that it works by means of a mixed roller-hammer action effected by a movable roller (or rollers) which roller (or rollers) itself provides a hammer-action. Another aspect of a pressure apparatus is an apparatus consisting of at least two pressing-edged surfaces having their press-edges in the form of a strip or bar, which edges compress between them the passing FE, which compression is realized by means of vibratory-hammering of one or both of these edges.

The heating apparatus may be fitted closely to the working surfaces of the press-apparatus, and if necessary, the complete machinery—(heat supplying apparatus and the transporter of FE and the mechanical press, etc.) may all be placed in a casing, wherein the required temperature $(T_r° + T_w°)$ will be maintained.

The fourteenth aspect of this invention consists of making the FE not from metal but from other suitable solids such as for instance, glass, celluloid, condensation products, plastic materials and the like—then if welding cannot be applied it may be replaced by sticking processes or equivalent chemical reactions combining the wires between them.

Various changes may also be made of the completed FE and in the embodiments of the metals we desire without departure from the spirit and scope of the invention, as the same will no doubt be understood by those skilled in the art.

What I claim is:

1. The method of manufacturing a filter element which comprises placing a plurality of metallic wires having a coefficient of linear expansion of at least 0.00001 per 1° centigrade and a diameter of at least 0.005 mm in a common plane and in parallel relation with each of said wires in contact with an adjacent wire throughout substantially its entire length, heating said wires to a temperature of at least 50° C., placing a plurality of transverse wires having a relatively low coefficient of expansion transverse to the first mentioned wires and in contact therewith in a plane parallel to the plane of the first mentioned wires, welding the transverse wires to the first mentioned wires while at substantially the said temperature, the coefficient of expansion of the transverse wires being so low that their decrease in length when cooled does not substantially decrease the distance between the first mentioned wires.

2. The method of manufacturing a filter element which comprises placing a plurality of metallic wires having a coefficient of linear expansion of at least 0.00001 per 1° C. and a diameter of at least 0.01 mm. in a common plane and in parallel relation with each of said wires in contact with an adjacent wire throughout substantially its entire length, heating said wires to a temperature of at least 50° C., placing a plurality of transverse wires having a relatively low coefficient of expansion transverse to the first mentioned wires and in contact therewith in a plane parallel to the plane of the first mentioned wires, welding the transverse wires to the first mentioned wires while at substantially the said temperature, the coefficient of expansion of the transverse wires being so low that their decrease in length when cooled does not substantially decrease the distance between the first mentioned wires, said first mentioned wires being previously subjected to a process diminishing the cohesion between their respective adjacent surfaces.

3. The method of manufacturing a filter element which comprises placing a plurality of glass wires having a coefficient of linear expansion of at least 0.000007 per 1° C. and a diameter of at least 0.1 mm. in a common plane and in parallel relation with each of said wires in contact with an adjacent wire throughout substantially its entire length, heating said wires to a temperature of at least 50° C., placing a plurality of transverse wires having a relatively low coefficient of expansion transverse to the first mentioned wires and in contact therewith in a plane parallel to the plane of the first mentioned wires, welding the transverse wires to the first mentioned wires while at substantially the said temperature, the coefficient of expansion of the transverse wires being so low that their decrease in length when cooled does not substantially decrease the distance between the first mentioned wires.

4. The method of manufacturing a filter element which comprises placing a plurality of metallic wires having a coefficient of linear expansion of 0.00001 per 1° centigrade and a diameter of at least 0.01 mm. in a common plane, said wires being at a distance apart of their adjacent wires of at least 0.001 mm. and in parallel relation with each of said wires, applying pressure to said first mentioned wires to deform same up to the moment that each of the said first mentioned wires comes in contact with an adjacent first mentioned wire substantially throughout its entire length, heating said wires to a temperature of at least 50° C., placing a plurality of transverse wires having a relatively low coefficient of expansion transverse to the first mentioned wires and in contact therewith in a plane parallel to the plane of the first mentioned wires, welding the transverse wires to the first mentioned wires while at substantially the said temperature, the coefficient of expansion of the transverse wires being so low that their decrease in length when cooled does not substantially decrease the distance between the first mentioned wires.

5. The method of manufacturing a filter element which comprises winding of at least one metallic wire having a coefficient of linear expansion of at least 0.00001 per 1° centigrade and a diameter of at least 0.01 mm. in a common plane and in such relation that each winding of the said first mentioned wires contacts with an adjacent winding of the said first mentioned wires through substantially its entire length, heating said wire to a temperature of at least 50° C., placing a plurality of transverse wires having a relatively low coefficient of expansion transverse to the said windings of the said first mentioned wires and in contact therewith in a plane parallel to the plane of the said first mentioned wires, welding the said transverse wires to the said first mentioned wires while at substantially the said temperature, the coefficient of expansion of the said transverse wires being so low that their decrease in length when cooled does not substantially decrease the distance between the said first mentioned wires.

6. The method of manufacturing a filter element which comprises winding of at least one metallic wire having a coefficient of linear expansion of at least 0.00001 per 1° centigrade and a diameter of at least 0.01 mm. in a common plane and in such relation that each winding of the said first mentioned wires, said windings of the said first mentioned wires being at a distance apart from their adjacent ones of at least 0.001 mm., applying pressure to the first mentioned wires to deform same up to the moment that each of said first mentioned wires comes in contact with an adjacent first mentioned wire substantially throughout its entire length, heating said wires to a temperature of at least 50° C., placing a plurality of transverse wires having a relatively low coefficient of expansion transverse to the said windings of the said first mentioned wires and in contact therewith in a plane parallel to the plane of the said first mentioned wires, welding the said transverse wires to the said first mentioned wires while at substantially the said temperature, the coefficient of expansion of the said transverse wires being so low that their decrease in length when cooled does not substantially decrease the distance between the said first mentioned wires.

GEORGE ALEXIS RUBISSOW.